3,005,001
O,O'-(2-BUTENYLENE) AND (2-BUTYNYLENE)
BIS-(O-ALKYL PHOSPHORAMIDOTHIOATES)
Herman O. Senkbeil, Midland, Mich., assignor to The Dow Chemical Company, Midland, Mich., a corporation of Delaware
No Drawing. Filed Nov. 14, 1960, Ser. No. 68,651
6 Claims. (Cl. 260—461)

This invention is directed to O,O'-(2-butenylene) and (2-butynylene) bis(O-alkyl phosphoramidothioates) corresponding to the formula:

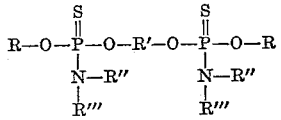

In this and succeeding formulae, R is an alkyl radical containing from 1 to 8 carbon atoms, inclusive, R' is a member selected from the group consisting of

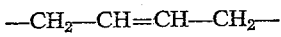

and —$CH_2$—$C{\equiv}C$—$CH_2$—, and R" and R'" are each selected from the group consisting of hydrogen and alkyl radicals containing from 1 to 6 carbon atoms, inclusive. These compounds are liquid materials which are somewhat soluble in many common organic solvents and of very low solubility in water. The compounds are useful as active toxicants in compositions for the control of mite, insect, helminth and ascarid organisms such as ticks, aphids, beetles and worms.

The novel compounds of the invention are prepared by reacting 2-butene-1,4-diol or 2-butyne-1,4-diol with an alkali metal to produce the diol di-alkali metal derivative having the formula:

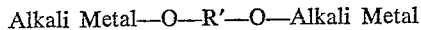

and thereafter reacting the derivative with an O-alkyl phosphoramidochloridothioate having the formula:

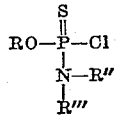

The reactions are carried out in an inert organic liquid as reaction medium, e.g., benzene, toluene, etc. The amount of the reagents to be employed is not critical, some of the desired product being obtained when employing any proportion of the reactants.

In a preferred method of operation, 2 molar proportions of the alkali metal are dispersed in the inert reaction medium and 1 molar proportion of the selected diol gradually admixed therewith while maintaining the reaction temperature at 10° to 80° C., preferably 25° to 50° C. In this reaction, hydrogen is evolved as a by-product. When the reaction is complete, 2 molar proportions of the O-alkyl phosphoramidochloridothioate are gradually added thereto with stirring or agitation while maintaining the reaction temperature at 10° to 80° C., preferably 25° to 35° C. After the complete addition of the latter reagent, the reaction mixture is allowed to stand until the reaction is completed, an alkali metal chloride being formed as a by-product. The reaction mixture is then preferably filtered to remove the alkali metal chloride, and the reaction medium is evaporated from the resulting filtrate under reduced pressure to obtain the desired product as a residue. This object may be further purified by conventional procedures such as washing and extraction.

The following examples merely illustrate the invention and are not to be construed as limiting.

*Example 1.—O,O'-(2-butenylene) bis(O-ethyl N-methyl phosphoramidothioate)*

Twenty-three grams of a 50 percent dispersion of sodium in toluene (0.5 mole of sodium) was mixed with 500 milliliters of benzene. To this mixture was added dropwise 46 grams (0.523 mole) of 2-butene-1,4-diol at 20°–25° C. over a 0.5 hour period. After addition of all of the diol, stirring of the mixture was continued for an additional hour after which 87 grams (0.5 mole) of O-ethyl N-methyl phosphoramidochloridothioate was added dropwise at 25°–30° C. over a 1 hour period. After this addition, stirring was continued for about 16 hours while maintaining the temperature of the mixture at 21°–22° C. Sodium chloride, formed as a by-product, was removed by filtering, and the benzene reaction medium was removed from the resulting filtrate by evaporation under reduced pressure at less than 30° C. The residue was further purified by extraction with carbon bisulfide. After removal of the carbon bisulfide by evaporation, there was obtained an O,O'-(2-butenylene) bis-(O-ethyl N-methyl phosphoramidothioate) product as a yellow liquid residue having a molecular weight of 362.4 and a refractive index of 1.5136 at 25° C.

*Example 2.—O,O'-(2-butenylene) bis(O-methyl N-methyl phosphoramidothioate)*

Twenty-three grams of a 50 percent dispersion of sodium in toluene (0.5 mole of sodium) was mixed with 500 milliliters of benzene. To this mixture was added dropwise 46 grams (0.523 mole) of 2-butene-1,4-diol at a temperature of 25°–35° C. over a 1.5 hour period. After stirring for an additional 1 hour, 80 grams (0.5 mole) of O-methyl N-methyl phosphoramidochloridothioate, dissolved in 400 milliliters of benzene, was added dropwise at a temperature of 26.5°–33.5° C. over a 1.5 hour period. Stirring was continued for an additional 4 hours at room temperature (about 23° C.) and then the mixture was allowed to stand undisturbed for 2 days. The sodium chloride formed was removed by vacuum filtration and the benzene reaction medium was evaporated from the filtrate under reduced pressure. The residue obtained was further purified by extraction with carbon bisulfide. After evaporation of the carbon bisulfide, there was obtained an O,O'-(2-butenylene)bis(O-methyl N-methyl phosphoramidothioate) product as a yellow liquid residue having a molecular weight of 334.4 and a refractive index of 1.5320 at 25° C.

*Example 3.—O,O'-(2-butynylene) bis(O-methyl N-methyl phosphoramidothioate)*

18.4 grams of a 50 percent dispersion of sodium in toluene (0.4 mole of sodium) was mixed with 500 milliliters of benzene. To this mixture was added with agitation 54 grams (0.63 mole) of 2-butyne-1,4-diol in solid portions over a 6 hour period while maintaining the temperature at 40°–50° C. The mixture was then heated at 48°–50° C. with agitation for an additional 16 hours. After reducing the temperature to 25°–30° C., 456 milliliters of a benzene solution containing 74 grams (0.4 mole) of O-methyl N-methyl phophoramidochloridothioate was added dropwise over a 2 hour period. After this addition, stirring was continued for an additional 2.5 hours at 25° C. The sodium chloride formed was removed by vacuum filtration and the benzene distilled from the filtrate. The resulting residue was further purified by extraction with carbon bisulfide. After evaporation of the carbon bisulfide, there was obtained an O,O'-(2-butynylene) bis(O-methyl N-methyl phosphoramidothioate) product as a light brown liquid having a molecular weight of 331.5 and a refractive index of 1.5335 at 25° C.

*Example 4.—O,O'-(2-butenylene) bis(O-butyl N,N-dihexyl phosphoramidothioate)*

12.4 grams of a 50 percent dispersion of sodium in toluene (0.27 mole of sodium) was mixed with 300 milliliters of benzene. To this mixture was added dropwise with agitation 24 grams (0.273 mole) of 2-butene-1,4-diol over a 5.5 hour period at 25°–30° C. Forty-eight grams (0.135 mole) of O-butyl N,N-dihexyl phosphoramidochloridothioate, dissolved in 25 milliliters of benzene, was then added with agitation over a 1 hour period at 25° to 30° C. After standing for 12 hours at room temperature, the mixture was washed with water to remove the sodium chloride formed. The remaining benzene solution was dried over calcium chloride, filtered and the benzene removed by evaporation under reduced pressure at room temperature. As a result of these operations, there was obtained an O,O'-(2-butenylene) bis(O-butyl N,N-dihexyl phosphoramidothioate) product as a yellow liquid residue completely soluble in carbon bisulfide, having a molecular weight of 727.1 and a refractive index of 1.4755 at 25° C.

In the same manner, other O,O'-(2-butenylene) and (2-butynylene) bis(O-alkylphosphoramidothioates) are prepared of which the following are representative:

O,O'-(2-butenylene) bis(O-octyl phosphoramidothioate) by reacting the disodium derivative of 2-butene-1,4-diol with O-octyl phophoramidochloridothioate.

O,O'-(2-butenylene) bis(O-propyl N-ethyl phosphoramidothioate) by reacting together the disodium derivative of 2-butene-1,4-diol and O-propyl N-ethyl phophoramidochloridothioate.

O,O'-(2-butynylene) bis(O-pentyl N-propyl phosphoramidothioate) by reacting together the disodium derivative of 2-butyne-1,4-diol and O-pentyl N-propyl phosphoramidochloridothioate.

O,O'-(2-butenylene) bis(O-heptyl N-sec. butyl phosphoramidothioate) by reacting together the di-potassium derivative of 2-butene-1,4-diol and O-heptyl N-sec. butyl phosphoramidochloridothioate.

O,O'-(2-butynylene) bis(O-isobutyl N-pentyl phosphoramidothioate) by reacting together the di-potassium derivative of 2-butyne-1,4-diol and O-isobutyl N-pentyl phosphoramidochloridothioate.

O,O'-(2-butenylene) bis(O-hexyl N-methyl N-ethyl phosphoramidothioate) by reacting together the disodium derivative of 2-butene-1,4-diol and O-hexyl N-methyl N-ethyl phosphoramidochloridothioate.

The new compounds of this invention have been found to be useful as insecticides and parasiticides for the control of a number of mites, insects and other parasitic organisms. For such use, the products may be dispersed on a finely divided solid and employed as dusts. Also, such mixtures may be dispersed in water with the aid of a wetting agent and the resulting aqueous suspensions employed as sprays. In other procedures, the products may be employed as constituents of oil-in-water emulsions or water dispersions with or without the addition of wetting, dispersing or emulsifying agents. In representative operations, aqueous compositions containing 50 parts by weight of O,O'-(2-butenylene) bis(O-ethyl N-methyl phosphoramidothioate) per million parts by weight of the composition give substantially 100 percent kills of two spotted spider mites.

The 2-butyne-1,4-diol employed as a starting material, as heretofore described, is prepared as set forth on page 797 of the textbook "Organic Chemistry" by Lewis F. Fieser and Mary Fieser, 3rd Edition (1956), published by Reinhold Publishing Corp., New York, N.Y. The 2-butene-1,4-diol employed as an alternative starting material is prepared by the conventional catalytic hydrogenation of 2-butyne-1,4-diol.

The O-alkyl phosphoramidochloridothioates employed as starting materials, as heretofore described, are prepared by the reaction, at a temperature of from 10° to 50° C., of 1 molecular proportion of an O-alkyl phosphorodichloridothioate with 2 molecular proportions of ammonia or an alkylamine such as methylamine, pentylamine, dimethylamine, dipropylamine, dipentylamine and dihexylamine. In carrying out the reaction, a benzene solution of the ammonia or the amine is added portionwise to the O-alkyl phosphorodichloridothioate reagent dissolved in benzene. Upon completion of the reaction, the hydrochloride by-product is separated by filtration and the benzene removed by evaporation to obtain the desired intermediate as a residue.

I claim:

1. The compounds corresponding to the formula:

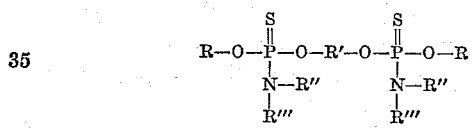

wherein R is an alkyl radical containing from 1 to 8 carbon atoms, inclusive, R' is a member selected from the group consisting of —CH$_2$—CH=CH—CH$_2$— and —CH$_2$—C≡C—CH$_2$—, and R'' and R''' are each selected from the group consisting of hydrogen and alkyl radicals containing from 1 to 6 carbon atoms, inclusive.

2. O,O'-(2-butenylene) bis(O-ethyl N-methyl phosphoramidothioate).

3. O,O'-(2-butenylene) bis(O-methyl N-methyl phosphoramidothioate).

4. O,O'-(2-butynylene) bis(O-methyl N-methyl phosphoramidothioate).

5. O,O'-(2-butenylene) bis(O-butyl N,N-dihexyl phosphoramidothioate).

6. O,O'-(2-butenylene) bis(O-octyl phosphoramidothioate).

No references cited.